Oct. 15, 1940.   J. C. CAIN ET AL   2,218,418
GAUGE EQUIPMENT
Filed Nov. 1, 1938
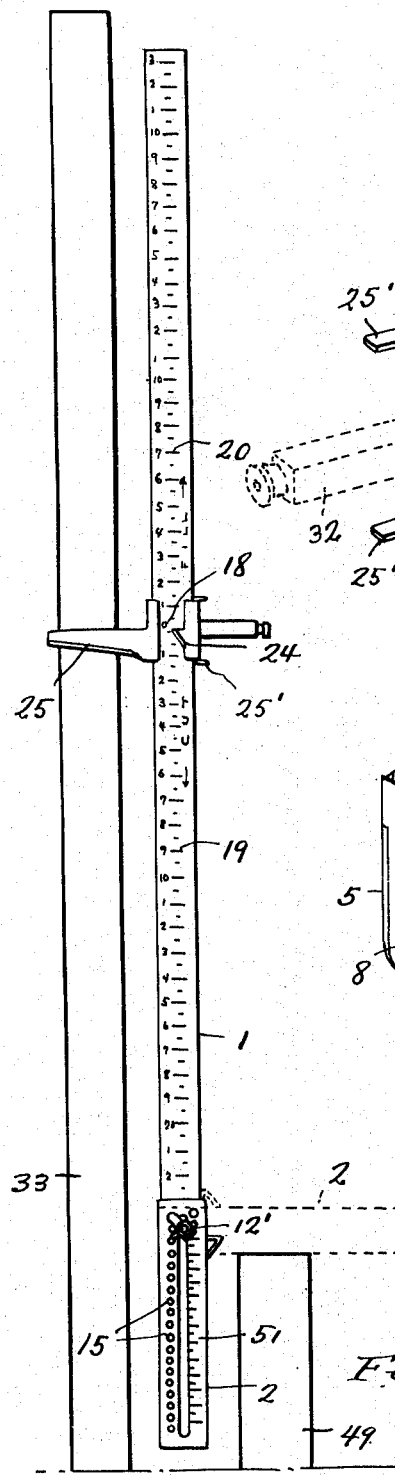
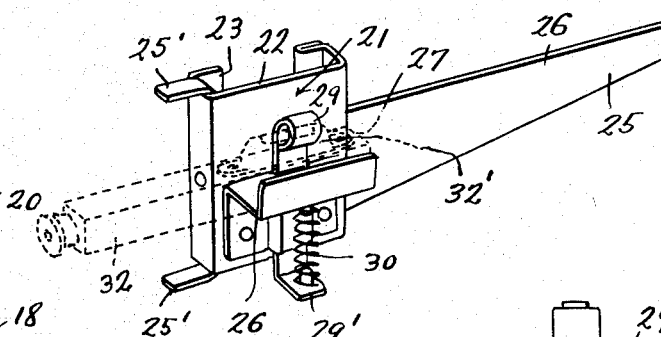
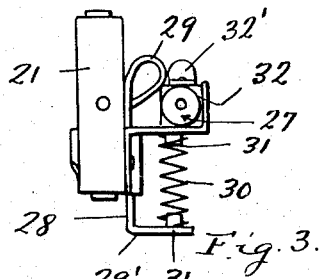
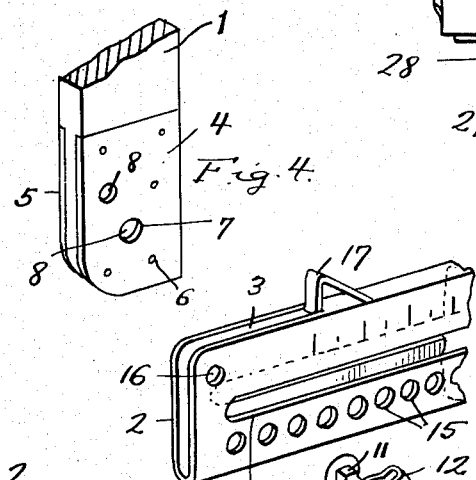
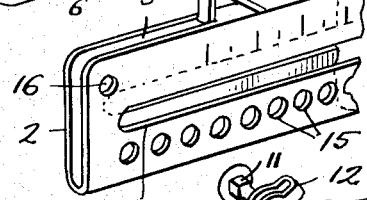
Inventors
J. C. Cain
H. F. Dent
By Clarence A. O'Brien
and Hyman Berman
Attorneys Patented Oct. 15, 1940

2,218,418

UNITED STATES PATENT OFFICE 2,218,418

GAUGE EQUIPMENT

John C. Cain and Harold F. Dent, Morgantown, W. Va.

Application November 1, 1938, Serial No. 238,244

2 Claims. (Cl. 33—74)

Our invention relates to improvements in gauge equipment for use in grading, more particularly on construction work.

The principal object of the invention is to provide apparatus adapted for speeding up and accurately establishing uniform elevated grades, checking the grading, and transmitting to operators of grading equipment information whereby the grading may be expeditiously accomplished.

To the accomplishment of the above, and subordinate objects presently appearing, a preferred embodiment of our invention has been illustrated in the accompanying drawing, set forth in detail in the succeeding description, and defined in the claims appended hereto.

In said drawing:

Figure 1 is a view in front elevation of the gauge rod and cross-head illustrating the manner in which the same is used in marking the signaling stakes.

Figure 2 is a view in perspective of the cross-head.

Figure 3 is a view in front elevation of said cross-head.

Figure 4 is a fragmentary view in perspective of the lower end of the gauge rod.

Figure 5 is a similar view of the adjustable extension arm of the gauge rod.

Figure 6 is a view in perspective of the bolt and lock nut for adjusting the extension arm.

Referring to the drawing by numerals, the apparatus of our invention comprises, as its basic element, a flat gauge rod, or bar 1 of any suitable length and metal and having a lower end provided with an extension arm 2 pivotally and slidably mounted thereon, as presently described, for adjustment to provide a linear variable extension of the rod, or, a right angled straight edge on said rod for projection to one side of the latter. The arm 2 is of flat sleeve-like form and suitable metal slidably fitting lengthwise over said rod 1 and has an open edge part at one end thereof, as at 3, so that it may be swung in its fully extended position about said rod. A pair of front and rear wear plates 4 and 5 are secured, as at 6, to said rod 1, and said plates are apertured, as at 7, and the rod 1, as at 8, to receive a bolt 9 passing through a pair of longitudinally extending central slots 10 in opposed sides of said arm, respectively, the bolt having a squared head part 11 fitting into one slot to hold the bolt against turning relative to the arm 2. A spring washer 12 is sleeved onto the bolt 9 and provided with a resilient arm 13 having a rearwardly extending locking stud 14 thereon. A wing nut 12' backs up the washer 12. The stud 14 is designed in the linearly extended position of the arm 2 to be inserted in selected apertures 15 of a lengthwise extending row provided on one side of the arm 2 to lock said arm to said rod 1 in different extended positions under pressure exerted against the washer by the nut 12', or, to be located in a corner aperture 16 provided in said sides of said arm when the latter is adjusted to provide a right angled straight edge, said stud together with said nut thereby locking said arm in right angled position. A stop 17 on one edge of the arm 2 coacts with one edge of the rod 1 to establish the right angled position of said arm.

The rod 1 has suitably delineated on the front face thereof and at a selected point, in this instance two and a half feet from bottom thereof for a purpose presently explained, a zero symbol 18 and is graduated in inches, or tenths of a foot, below and above said symbol as at 19 and 20. Graduations 19 below the symbol 18 are numbered 1 to 10 in series and in successively higher order in each series downwardly. The graduations 20 are similarly numbered in series with the numbers in each series ascending in order upwardly. The graduations 19 are for use in cutting operations and the graduations 20 for filling operations. Accordingly, said graduations are designated on the rod 1 by the words "Cut" and "Fill."

Slidably mounted on the rod 1 is a cross-head 21 including a sleeve-like slide 22 having an open front 23 and an edge pointer lug 24 in the opening of said front for registration with the graduations 19 and 20. The slide 22 is provided with a flat rule extension 25 projecting from one side thereof with an upper edge at a right angle to the side of the bar 1 opposite to that to which the arm 2 may be adjusted. On the rear side of the slide 22 is a right angled transversely extending ledge 26 supporting a rectangular, or other shaped, hand level 27 extending across the rear side of the bar 1 at a right angle to the latter. The level 27 is detachably secured on the ledge 26 by means of a keeper 28 vertically slidable in said ledge 26 and having an upper laterally extending rounded end 29 adapted to engage the top of said level, and a similarly extending lower end 29' between which and said ledge a coiled spring 30 is interposed and suitably anchored at its ends, as at 31, said spring urging said keeper downwardly whereby the level is detachably clamped to the ledge by said keeper and flat against the same. The hand level 27 is of the type embodying a longitudinally bored sight barrel 32 and a short spirit tube 32' on the top of the barrel and is adapted to be located, when the level is attached, with said sight barrel aligned with the pointer lug 24 for a purpose presently clear. The slide 22 is frictionally held to the bar 1 by resilient fingers 25' engaging one edge of said bar.

Referring to the operation and use of the invention, in road grading operations, stakes 33 are driven into the ground alongside the usual hub-stakes 49 shown in Figure 1, and a point of uniform distance above the finished grade line is established on all such stakes 33. The distance of this point above the finished grade line may be predetermined to suit conditions. However, it has been found that two and a half feet is best suited for most conditions. The point is established by adjusting the arm 2 on rod 1 to form a right angled straight edge thereon, in the manner previously described, and with the rod 1 disposed alongside the selected stake 33, using the stake 49 as a rest for the arm 2. The cross-head 21 is then adjusted upwardly, or downwardly, on the rod 1 from the zero 18 to register the lug 24 with a selected graduation 20 or 19 in accordance with the exact amount of "fill" or "cut" desired and with the rule 25 across the face of the stake 33, it being understood that this amount is indicated on the hub-stake 49. In this position of the cross-head a line is marked across the stake 33, using the rule 25. The mark on the stake 33 is designed to indicate the position thereon at which a signalling device, not shown, is to be attached for indicating to an operator of a grading machine the amount of cut or fill required opposite said stake and which signalling device need merely be mentioned in passing in order to clarify the use of the invention.

When using the apparatus for checking grading, the arm 2 is swung on the rod 1 into linearly extended position thereon, the rod 1 stood on the sub-grade, or grade, opposite the stake 33 with the arm resting on said grade and the cross-head 21 adjusted upwardly along the rod 1 until the locator lug 24 is in horizontal alignment with the mark on the stake 33, such adjustment of cross-head 21 being made with the aid of the hand level 27 and until the level 27 is horizontally aligned with said mark. At this point it should be explained, that the arm 2 is graduated, as at 51, for adjustment on the bolt 9 in accordance with the exact thickness of material to be placed on or cut from a sub-grade to bring the same to a finished grade. Hence, under such adjustment of the arm 2, when the cross-head 21 is in the described position of adjustment, the exact amount to be cut or filled, or whether or not the grade is established, may be determined by means of the pointer lug 24 and graduations 19 or 20.

The foregoing will, it is believed, suffice to impart a clear understanding of our invention without further explanation.

Manifestly, the invention as described, is susceptible of modification without departing from the inventive concept and right is herein reserved to such modifications as fall fairly within the scope of the subjoined claims.

What we claim is:

1. Gauging apparatus for use with a grading stake to selectively mark a signalling stake driven alongside the grading stake comprising a graduated gauge rod adapted to be stood on end on the grading stake alongside the signalling stake, a cross head slidable on the gauge rod lengthwise thereof to select the graduations thereon and having a straight edge blade extending laterally therefrom for use against the signalling stake as a ruler in marking said signalling stake, and a straight extension arm on the lower end of said gauge rod, said arm being pivoted on said rod for adjustment thereon into laterally extending position whereby said arm may be used to rest the rod on the grading stake in laterally off-set position relative thereto, and said arm being slidable lengthwise on said rod into linearly extending set positions to extend the overall length of the rod in accordance with the height of different grading stakes from the ground whereby said rod may be stood upright on the ground and the markings accurately checked through the medium of said stake, blade and graduations on said rod.

2. Gauging apparatus for use with a grading stake to selectively mark a signalling stake driven alongside the grading stake comprising a graduated gauge rod adapted to be stood on end on the grading stake alongside the signalling stake, a cross head slidable on the gauge rod lengthwise thereof to select the graduations thereon and having a straight edge blade extending laterally therefrom for use against the signalling stake as a ruler in marking said signalling stake, and a straight extension arm on the lower end of said gauge rod, said arm being pivoted on said rod for adjustment thereon into laterally extending position whereby said arm may be used to rest the rod on the grading stake in laterally off-set position relative thereto, and said arm being slidable lengthwise on said rod into linearly extending set positions to extend the overall length of the rod in accordance with the height of different grading stakes from the ground whereby said rod may be stood upright on the ground and the markings accurately checked through the medium of said stake, blade and graduations on said rod, and a spirit level mounted on said cross head and having a sight barrel whereby in checking said rod may be adjusted perpendicular to the ground and the marking sighted at a substantial distance therefrom.

JOHN C. CAIN.
HAROLD F. DENT.